United States Patent [19]

Benshoof

[11] Patent Number: 4,638,546
[45] Date of Patent: Jan. 27, 1987

[54] METHOD AND MEANS FOR MOUNTING A VEHICLE SEAT

[76] Inventor: Steven C. Benshoof, 2816 Lyon St., Des Moines, Iowa 50317

[21] Appl. No.: 795,190

[22] Filed: Nov. 5, 1985

Related U.S. Application Data

[63] Continuation-in-part of Ser. No. 609,966, May 14, 1984, abandoned.

[51] Int. Cl.⁴ .......................... B23P 19/00; B60N 1/00
[52] U.S. Cl. ..................................... 29/526 R; 296/63
[58] Field of Search ................... 248/501, 503.1, 225.2; 296/63, 65 R; 211/192; 29/526

[56] References Cited

U.S. PATENT DOCUMENTS

| | | | |
|---|---|---|---|
| 3,697,034 | 10/1972 | Shell | 211/192 |
| 3,915,493 | 10/1975 | Brown | 296/63 |
| 4,133,433 | 1/1979 | Wolf | 211/192 |
| 4,171,789 | 10/1979 | Hoek et al. | 211/192 |
| 4,224,947 | 9/1978 | Nelson | 248/503.1 |
| 4,230,432 | 10/1980 | Howell | 248/503.1 |

FOREIGN PATENT DOCUMENTS 199267 6/1923 United Kingdom ................ 248/501
214582 4/1925 United Kingdom ................ 248/501

*Primary Examiner*—Howard N. Goldberg
*Assistant Examiner*—Steven Nichols
*Attorney, Agent, or Firm*—Zarley, McKee, Thomte, Voorhees & Sease

[57] ABSTRACT

The present invention comprises attaching a floor plate to the supporting surface or floor of a vehicle. The floor plate includes a raised horizontal portion having a plurality of elongated bayonet slots therein. A pedestal assembly adapted to support the chair includes a base plate and an upstanding pedestal member. The base plate has a plurality of bayonet members arranged to fit within the bayonet slots in the raised portion of the floor plate. Each bayonet member has a downwardly extending portion and a forwardly extending finger. To mount the device to the vehicle, the bayonet members are inserted into the bayonet slots and the base plate is moved forwardly until the downwardly projecting portions of the bayonet members engage the forward ends of the slots. The base plate is then secured against rearward movement with respect to the floor plate.

4 Claims, 9 Drawing Figures

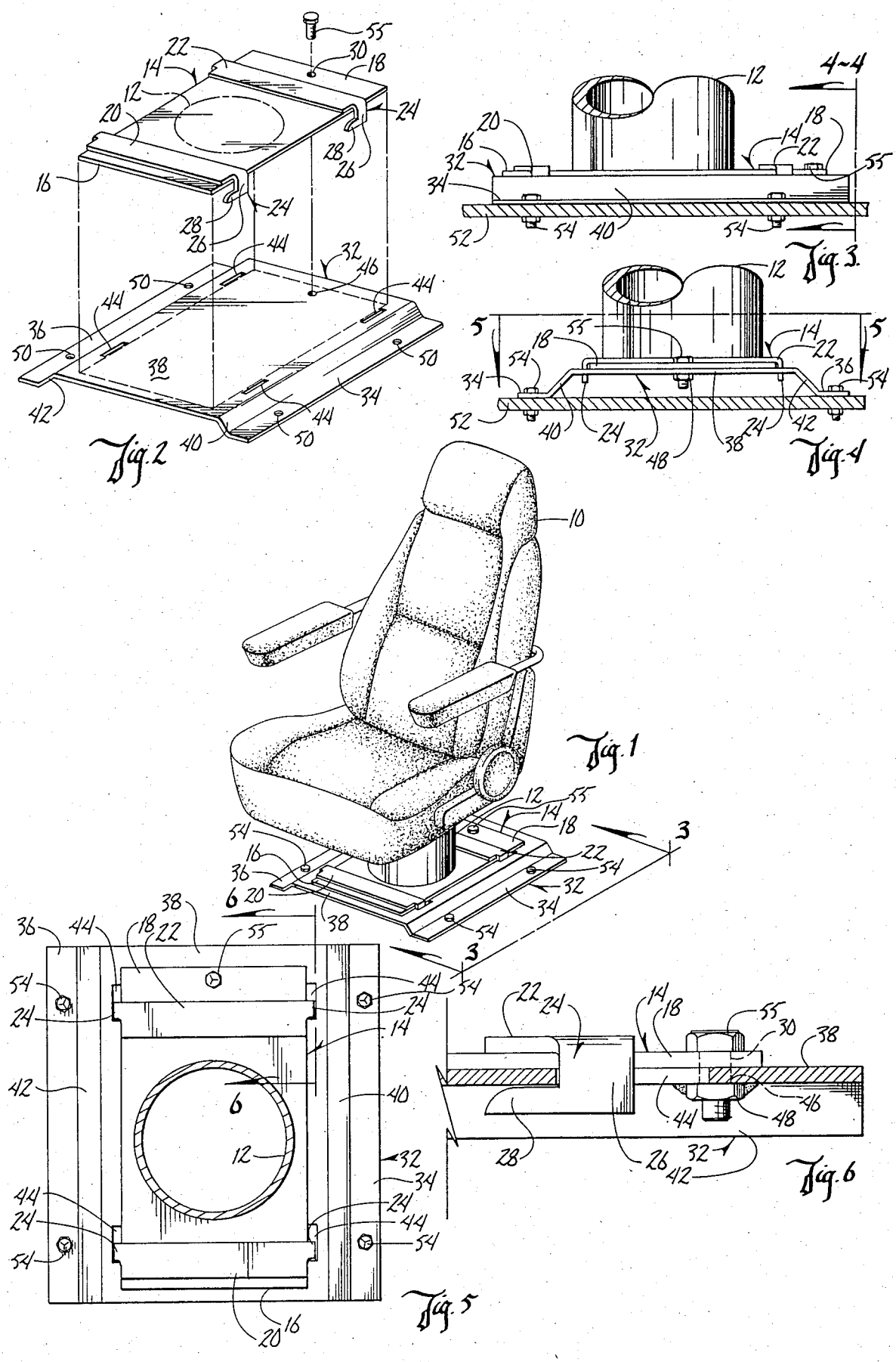

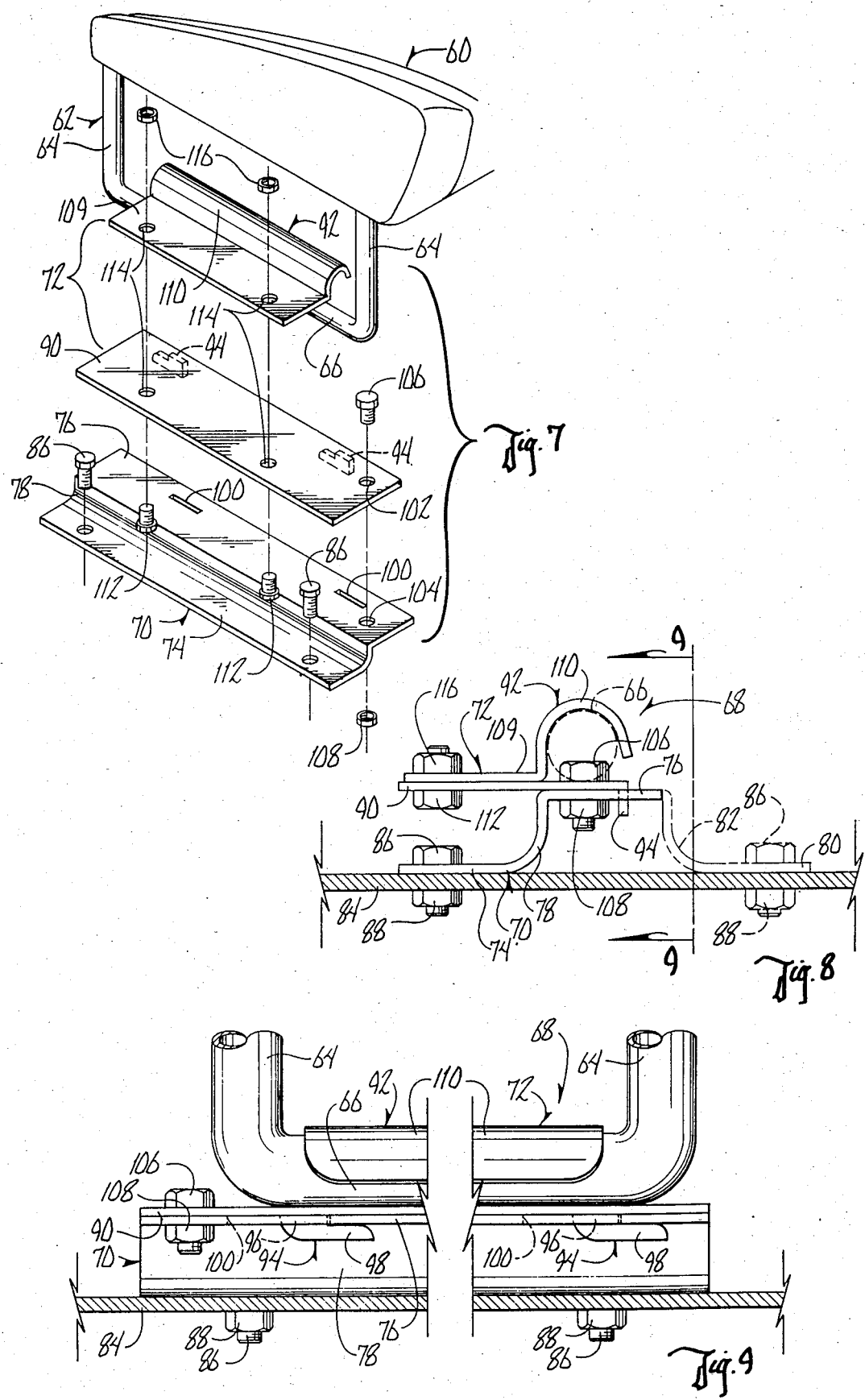

METHOD AND MEANS FOR MOUNTING A VEHICLE SEAT

BACKGROUND OF THE INVENTION

This is a continuation-in-part of application Ser. No. 609,966, filed May 14, 1984, now abandoned.

This invention relates to an improved method and means for mounting a vehicle seat to a vehicle.

In many vehicles, it is desirable to be able to insert and remove the seats so that the vehicle can be used for different functions. This is particularly true with vans and station wagons.

While it is desirable to be able to remove the vehicle seat easily and quickly, it is also necessary that the vehicle seat, when installed, be fastened securely to the floor of the vehicle for safety purposes. Presently known methods for securing the seats to the vehicle involve the use of numerous bolts and fastening means.

Because numerous bolts are used in present devices, it is a cumbersome and difficult task to remove the seat from the vehicle. The bolts often extend through the vehicle floor, and as a result, they often become rusted and difficult to loosen.

Therefore, a primary object of the present invention is the provision of an improved bracket for securing a vehicle seat to the vehicle floor.

A further object of the present invention is the provision of a bracket which permits quick and easy removal of the seat as desired.

A further object of the present invention is the provision of a bracket which permits safe securement of the seat to the vehicle while at the same time only using one bolt.

A further object of the present invention is the provision of a bracket for securing a seat to a vehicle wherein the single bolt that is used is not exposed to the undersurface of the vehicle and consequently is not as susceptible to rusting as with present devices.

A further object of the present invention is the provision of a bracket for mounting a seat to a vehicle, which can be easily adapted for use with current seats presently being used in vans and station wagons.

A further object of the present invention is the provision of a bracket which can be adapted to mount either a pedestal type seat or a sofa type seat to a vehicle floor.

A further object of the present invention is the provision of a device which is economical to manufacture, durable and safe in use, and efficient in operation.

SUMMARY OF THE INVENTION

The present invention utilizes a floor plate which is permanently affixed to the floor. The floor plate includes a raised horizontal portion which is spaced upwardly from the floor of the vehicle. Extending through the raised horizontal portion are a plurality of bayonet slots.

A base plate is adapted to be detachably secured to the horizontal raised portion of the floor plate. The base plate includes a plurality of bayonet members which are adapted to fit within the bayonet slots of the floor plate. The bayonet members each include a downwardly projecting portion and a forwardly projecting finger at the lower end of the downwardly projecting portion. After the bayonet members are inserted into the slots, the base plate is moved forwardly so that the bayonet fingers extend under the horizontal portion of the floor plate, thereby preventing upward movement of the base plate with respect to the floor plate.

A single bolt is then threaded through both the base plate and the horizontal portion of the floor plate so as to secure the two against longitudinal movement with respect to one another. This bolt is positioned at the rear edge of the base plate and floor plate, and the bayonet fingers protrude forwardly with respect to the base plate, the floor plate, and the vehicle itself. With this arrangement, when the vehicle is braked or stopped suddenly, the forward momentum of the base plate with respect to the floor plate is resisted by the downwardly projecting portions of the bayonet members. These downwardly projecting portions engage the forward ends of the slots in the floor plate and prevent forward movement of the seat with respect to the vehicle. Thus, a tight and secure attachment is provided.

When it is desired to remove the seat from the vehicle, all that is necessary is to remove the one bolt and to slide the base plate rearwardly and upwardly so that the bayonet members are removed from the slots.

The bolt, when holding the base plate in its locked position, extends through both the base plate and the horizontal portion of the floor plate. It is threaded through a nut on the under surface of the horizontal portion of the floor plate. This nut is above the floor itself and below the horizontal portion of the floor plate, so that it is not exposed to the elements underneath the floor of the car as is the case with present methods for securing the seat to the vehicle.

Extending upwardly from the base plate is a pedestal which is welded or otherwise fixed to the base plate. The seat itself is then bolted or otherwise secured to the pedestal in conventional fashion. It is possible for the seat to be mounted for swivel movement on the pedestal, or it can be fixed against movement with respect to the pedestal. The base plate and bayonet slot mounting of the present device is adaptable for either type of arrangement.

The base plate can also be modified to accommodate a sofa type seat having a tube shaped leg which includes a horizontal portion. The base plate includes an arcuate portion adapted to clamp over and retentively engage the horizontal portion of the tube shaped sofa leg.

BRIEF DESCRIPTION OF THE FIGURES OF THE DRAWINGS

FIG. 1 is a perspective view of the present invention with a vehicle seat mounted on the upper surface thereof.

FIG. 2 is a perspective exploded view of the base plate and the floor plate, showing their positions relative to one another.

FIG. 3 is a partial enlarged sectional view taken along line 3—3 of FIG. 1.

FIG. 4 is a sectional view taken along line 4—4 of FIG. 3.

FIG. 5 is a sectional view taken along line 5—5 of FIG. 4.

FIG. 6 is a sectional view taken along line 6—6 of FIG. 5.

FIG. 7 is an exploded perspective view of a modified form of the invention.

FIG. 8 is an end view of the modified form of the bracket of FIG. 7.

FIG. 9 is a sectional view taken along line 9—9 of FIG. 8.

DETAILED DESCRIPTION OF THE PREFERRED EMBODIMENT

Referring to FIGS. 1-6, the numeral 10 generally refers to a vehicle seat. Vehicle seat 10 is operatively secured to the upper end of a cylindrical pedestal 12. The means for securing the seat to the upper end of pedestal 12 is conventional, and therefore is not shown.

Pedestal 12 is welded or otherwise fixed to the upper surface of a base plate 14 which has a forward end 16 and a rearward end 18. Extending transversely across base plate 14 are a pair of forward and rearward straps 20, 22 which are welded or otherwise fixed to the upper surface of base plate 14. The opposite ends of straps 20, 22 are each provided with a bayonet member 24 which is comprised of a downwardly extending leg 26 and a forwardly extending finger 28. Adjacent the rearward end 18 of plate 14 is a bolt hole 30.

Below base plate 14 is a floor plate 32 which is comprised of a pair of side horizontal flanges 34, 36, a raised horizontal center portion 38, and a pair of upwardly inclined portions 40, 42. Horizontal portion 38 is provided with four elongated bayonet slots 44 and with a vertical hole 46. On the under surface of horizontal portion 38 in registered alignment with bore 46, is a nut 48 (FIGS. 4 and 6) which is welded in position to the under surface of horizontal portion 38.

Floor plate 32 includes a plurality of bolt holes 50. Floor plate 32 is meant to be permanently secured to the floor 52 of a vehicle. This is accomplished by a plurality of bolts 54 which extend through the holes 50 in floor plate 32 and which also extend through holes which are bored in floor 52. In this position, as can be seen in FIG. 4, horizontal raised portion 38 is elevated above the upper surface of floor 52.

Base plate 14 is detachably mounted to floor plate 32 by inserting the bayonet members 24 into the solts 44. In this position, the fingers 28 are below the raised portion 38 of floor plate 32. After the bayonet members 24 have been inserted into the slots 44, the base plate 14 is moved forwardly with respect to the floor plate 32. This causes the fingers 28 of bayonet members 24 to extend underneath the raised porion 38 of floor plate 32 as shown in FIG. 6. In this position, the downwardly extending legs 26 abut against the forward ends of slots 44, thereby preventing any further forward movement of base plate 14 with respect to the floor plate 32, or with respect to the floor 52 of the vehicle. Because fingers 28 protrude beneath the horizontal raised portion 38 of floor plate 32, they prevent upward movement of the base plate 14 with respect to the floor plate 32 and the floor 52 of the vehicle.

With the bayonet members 24 in the position shown in FIG. 6, hole 30 of base plate 14 and hole 46 of floor plate 32 are in registered alignment. A locking bolt 55 is inserted through these registered holes and is threaded through nut 48.

Bolt 55, when threaded through nut 48, prevents rearward movement of base plate 14 with respect to floor plate 32, and therefore retains the floor plate and the base plate tightly secured to one another.

When it is desired to remove the seat from the vehicle, all that is necessary is to remove bolt 55, slide base plate 14 rearwardly and lift the bayonet members 24 upwardly out of bayonet slots 44. Only one bolt need be removed, and it is not necessary to remove any of the bolts 54 which secure the floor plate 32 to the floor 52 of the vehicle.

Reinsertion of the seat is an equally simple process. All that is necessary is to insert the bayonet members 24 into the bayonet slots 44, slide the base plate 14 forwardly to its extreme forward position, and to rethread bolt 55 into nut 48.

The present invention provides a very solid securement of the seat 10 to the vehicle floor, and is therefore believed to provide a safe mounting for the seat. However, the bolt 55 is not exposed to the elements beneath the floor of the vehicle, and therefore it does not tend to become rusted as easily as in present mounting devices. Furthemore, only one bolt is used to hold the seat in place, and the seat can easily be removed merely by removing one bolt and lifting the bayonet members out of the slots 44.

While the base plate of FIGS. 1-6 is shown with the fingers 28 of bayonet members 24 extending in a forward direction, it is also possible to reverse their direction so that they extend in a rearward direction. In this reversal, the forward momentum of the seat in a collision is borne primarily by the bolt 55 rather than the bayonet members 24. For this reason it is preferred, although not absolutely necessary, that the fingers 28 extend in a forward direction with respect to the vehicle.

Referring to FIGS. 7-9, the numeral 60 designates the end of a sofa type seat having a tubular leg 62 which is U-shaped and includes a pair of upstanding leg portions 64 which are interconnected at their lower ends by a horizontal leg portion 66.

A modified form of the bracket of the present invention is generally designated by the numeral 68. Bracket 68 includes a floor plate 70 and a base plate 72. Floor plate 70 comprises a lower horizontal portion 74 and an upper horizontal portion 76 which is spaced above lower horizontal portion 74 and which is connected thereto by an upwardly extending arcuate portion 78. In FIG. 8, phantom lines are used to designate an alternate configuration for floor plate 70 wherein a second lower horizontal portion 80 may be connected to upper horizontal portion 74 by means of a second arcuate portion 82. The preferred configuration for floor plate 70 is the configuration shown in solid lines in FIG. 8, but the floor plate may be extended as shown by phantom lines in FIG. 8. Floor plate 70 is mounted to the floor 84 of the vehicle by means of bolts 86 and nuts 88.

Base plate 72 comprises a first plate member 90 and a second base plate member 92. First base plate member 90 is rectangular in shape and includes a pair of downwardly extending bayonet members 94, each of which includes a downwardly extending leg 96 and a rearwardly extending finger 98. Bayonet members 94 are adapted to fit within a pair of spaced apart elongated slots 100 in the upper horizontal portion 76 of floor plate 70. Slots 100 are slightly longer than the fingers 98 of bayonet members 94 so as to permit the bayonet members to fit downwardly within slots 100. After the bayonet members have been inserted downwardly into slots 100, they are moved rearwardly to the position shown in FIG. 9 so that the fingers 98 extend under the rearward ends of slots 100. In this position, fingers 98 prevent the base plate 90 from moving upwardly away from the floor plate 70.

Base plate 90 includes a locking bolt hole 102 which is spaced from the bayonet members 94 and which is adapted to register with a similar locking bolt hole 104 in the upper horizontal portion 76 of floor plate 70 whenever the bayonet members 94 are moved to the position shown in FIG. 9. A locking bolt 106 is adapted to protrude downwardly between the registered holes 102, 104 when the base plate 90 is moved to the position shown in FIG. 9, and locking bolt 106 is secured in place by threading it through a nut 108 below the horizontal portion 76 of base plate 70.

Second base plate member 92 provides means for retentively engaging the horizontal leg portion 66 of tubular leg 62. Plate member 92 includes a flat horizontal portion 109, and an arcuate hook-like portion 110 which is adapted to fit over the top of the horizontal leg portion 66 of tubular leg 62. In some cases, tubular leg 62 is square in cross-section rather than the round configuration such as shown in the drawings. In such a case, the arcuate hook portion 110 can be shaped to conform to the square cross-section of the tubular leg 62. Base plate member 92 is rigidly secured to first base plate member 90 by means of a pair of bolts 112 which extend through registered bolt holes 114 and are secured in place by nuts 116.

It can be appreciated that numerous ways may be provided for clamping or attaching base plate 72 to the horizontal leg portion 66 of seat 60. The use of second base plate member 92 illustrates one of these means, but other ways can be utilized without detracting from the invention.

Once the horizontal leg portion 66 is attached to base plate 72, the base plate 72 can be easily attached to the floor plate 70 by inserting the bayonet members 94 within slots 100 and by moving them to their extreme rearward positions so that the locking bolt holes 102, 104 are registered with one another. These locking bolt holes register only when the bayonet members are in their extreme rearward position as shown in FIG. 9. Bolt 106 is then inserted into the registered holes 102, 104 and nut 108 is tightened. It is possible to weld nut 108 to the lower end of locking bolt hole 104 so that the bolt 106 can merely be inserted into the registered holes 102, 104 and threaded downwardly into bolt 108.

The seat 60 can be removed merely by removing one bolt, i.e., locking bolt 106. All that is necessary then to remove the seat is to slide the seat forwardly so that bayonet members 94 are free to move upwardly out of slots 100. Similarly, to reinsert the seat one need merely insert the bayonet members 94 into the slots 100 and slide them rearwardly to the position shown in FIG. 9. Insertion of the bolt 106 locks the seat against movement in either a forward or a rearward direction.

As explained with respect to the modification shown in FIGS. 1-6, the fingers 98 of the bayonet members 94 can be extended either in a forwardly or a rearwardly direction with respect to the front and rear of the vehicle. In the drawings, they are shown extending in a rearward direction, but increased stability can be accomplished by extending the fingers in a forward direction so that the bayonet members 94 will resist forward movement of the seat in response to a collision while the vehicle is moving forwardly.

Thus, it can be seen that the device accomplishes at least all of its stated objectives.

What is claimed is:

1. A bracket for securing a seat to the floor of a vehicle, said vehicle having a longitudinal centerline, said seat having a horizontal tubular member thereon, said bracket comprising:
    a floor plate means having more than one floor plate bolt hole therein for anchoring said floor plate means to said vehicle floor, said floor plate means having a raised horizontal portion which is spaced above and parallel to said vehicle floor when said floor plate means is anchored to said vehicle floor;
    said horizontal portion having at least two elongated bayonet slots therein and a round first bolt hole extending therethrough in spaced relation to said bayonet slots, said bayonet slots each having opposite ends and extending in a direction parallel to said longitudinal axis of said vehicle;
    a base plate means having attachment means for securing said base plate means to said floor plate means and further having tube engaging means for retentively engaging said tubular member of said seat;
    said attachment means comprising at least two spaced apart integral bayonet members, each of said bayonet members comprising a downwardly extending leg and a finger extending in a direction parallel to said longitudinal axis of said vehicle.

2. A bracket assembly for securing a seat to the floor of a vehicle comprising:
    floor plate means having more than one floor plate bolt hole therein for anchoring said floor plate means to said vehicle floor, said floor plate means having a raised horizontal portion which is spaced above and parallel to said vehicle floor when said floor plate means is anchored to said vehicle floor;
    said horizontal portion having at least two elongated bayonet slots therein and a round first bolt hole extending therethrough in spaced relation to said bayonet slots, said bayonet slots each having forward and rearward ends,
    a base plate means adapted to removably secure said vehicle seat to said vehicle floor, said base plate means having at least two spaced apart integral bayonet members, each of said bayonet members comprising a downwardly extending leg and a forwardly extending finger, said base plate means further having a round second bolt hole therein which is spaced from said bayonet members;
    said base plate means being movable forwardly from a first position wherein said bayonet fingers are within said bayonet slots of said floor plate means and are free to move upwardly out of said bayonet slots to a second position wherein said fingers extend forwardly below said forward ends of said bayonet slots and said downwardly extending legs of said bayonet members engage said forward ends of said bayonet slots, said first bolt hole of said floor plate and said second bolt hole of said base plate being in registered alignment only when said base plate means is in said second position;
    a single locking bolt extending through said registered first and second bolt holes when said base plate means is in said second position for holding said base plate means against rearward movement from said second position with respect to said floor plate means, said single locking bolt being removable from said first and second bolt holes to free said base plate means for rearward movement to said first position so as to permit removal of said bayonet member upwardly out of said bayonet slots, said base plate means being movable from said second position only when said single locking bolt is removed from said registered first and second bolt holes.

3. A bracket assembly according to claim 2 comprising a threaded nut member attached below said raised horizontal position of said floor plate means and having a threaded opening registered with said first bolt hole for threadably receiving said locking bolt.

4. A method for detachably securing a seat to the floor of a vehicle having forward and rearward ends, said method comprising:

attaching a floor plate to said vehicle floor, said floor plate including a raised horizontal portion which is spaced above said vehicle floor when said floor plate is attached to said vehicle floor, said raised portion having at least one elongated bayonet slot therein having forward and rearward ends, said floor plate further having a first bolt hole extending through said horizontal portion in spaced relation to said bayonet slots, positioning a base plate having at least one bayonet member thereon above said horizontal portion of said floor plate with said bayonet member being in registered alignment over said bayonet slot, said bayonet member comprising a downwardly extending leg, and a horizontally extending finger, said base plate having a second bolt hole extending therethrough and being spaced from said bayonet member, lowering said base plate to a first position wherein said bayonet member is within said bayonet slot with said finger being below said horizontal portion of said floor plate and with said downwardly extending leg extending downwardly through said bayonet slot, moving said base plate forwardly with respect to said floor plate to a second position wherein said leg abuts against said forward end of said slot and said finger extends forwardly from said forward end of said slot and below said horizontal portion of said floor plate, said first bolt hole of said floor plate and said second hole of said base plate being in registered alignment only when said base plate is in said second position;

inserting a single bolt through said registered first and second bolt holes when said base plate is in said second position to secure said base plate against rearward movement with respect to said floor plate whereby said single bolt and said bayonet member combine to hold said base plate against movement with respect to said floor plate and said vehicle floor, operatively securing said base plate to said seat when said base plate is in said second position.

* * * * *